(12) United States Patent  
Chen et al.

(10) Patent No.: US 7,891,995 B2
(45) Date of Patent: Feb. 22, 2011

(54) ELECTRONIC DEVICE WITH HIDDEN I/O INTERFACE MODULE

(75) Inventors: Kuan-Ting Chen, Taipei (TW); Chao-Ming Chu, Taipei (TW); Yi-Ting Chen, Taipei (TW)

(73) Assignee: Asustek Computer, Inc., Taipei (TW)

( * ) Notice: Subject to any disclaimer, the term of this patent is extended or adjusted under 35 U.S.C. 154(b) by 0 days.

(21) Appl. No.: 12/707,141

(22) Filed: Feb. 17, 2010

(65) Prior Publication Data

US 2010/0240239 A1 Sep. 23, 2010

(30) Foreign Application Priority Data

Mar. 18, 2009 (TW) ................ 98108781 A

(51) Int. Cl.
*H01R 13/44* (2006.01)
*H01R 13/60* (2006.01)
(52) U.S. Cl. ..................................... 439/131
(58) Field of Classification Search .......... 439/142, 439/139, 131
See application file for complete search history.

(56) References Cited

U.S. PATENT DOCUMENTS

2009/0147469 A1\* 6/2009 Chen et al. ............. 361/679.55

\* cited by examiner

*Primary Examiner*—Javaid Nasri
(74) *Attorney, Agent, or Firm*—Thomas, Kayden, Horstemeyer & Risley, LLP

(57) ABSTRACT

An electronic device with a hidden I/O interface module is disclosed. The electronic device includes a container and a surface with an opening, container and the opening communicate with each other. The container includes a first position and a second position. The electronic device also includes an I/O connection unit, a pivot module and a cover. The I/O connection unit is disposed at the container, electrically connected to the electronic device and includes a connecting surface. The pivot module is connected to the I/O connection unit. The cover is connected to the pivot module. When the cover is shut, it covers the container and makes the I/O connection unit located at the first position. When the cover is open, it drives the pivot module to drive the I/O connection unit to move to the second position to make the connecting surface of the I/O connection unit aligned with the surface.

7 Claims, 4 Drawing Sheets

ELECTRONIC DEVICE WITH HIDDEN I/O INTERFACE MODULE

CROSS-REFERENCES TO RELATED APPLICATIONS

This non-provisional application claims priority under 35 U.S.C. §119(a) on Patent Application No. 98108781 filed in Taiwan, R.O.C. on Mar. 18, 2009, the entire contents of which are hereby incorporated by reference.

BACKGROUND OF THE INVENTION

1. Field of the Invention

The invention relates to an electronic device with input/output (I/O) interface and, more particularly, to an electronic device with a hidden I/O interface module.

2. Description of the Related Art

An electronic device makes people's life more convenient. To take a computer as an example, it's widely used because of high processing efficiency. With the advent of a notebook computer, the computer device becomes a portable electronic device to allow the user to use it anywhere and anytime without position limitation.

Generally, a computer includes an I/O interface to connect peripherals. The I/O interface not only allows the computer to be connected with peripheral equipment, but also expands functions of the computer by connecting peripheral elements.

However, generally, to a computer device, especially a notebook computer, most I/O interfaces are disposed at four sides of the notebook computer separately. Thus, the I/O ports are disposed around the notebook computer inharmoniously, and the aesthetic property of the notebook computer is affected.

In addition, the electronic device gradually becomes light and slim. Since the notebook computer is portable and movable, the user often brings it, and it should be light and slim for convenience.

However, the mode of disposing the I/O interface in a notebook computer blocks the notebook computer from being light and slim. For example, the conventional I/O interface is disposed at the side of the notebook computer and protrudes at the lower part. That is, the thickness of the side of the notebook computer is at least the sum of the thickness of the case and the thickness of the I/O interface. Thus, the I/O interface may be disposed smoothly. Therefore, the mode of disposing the conventional I/O interface affects the lightness and slimness design of the notebook computer.

BRIEF SUMMARY OF THE INVENTION

The invention discloses an electronic device with a hidden I/O interface module. The electronic device includes a container and a surface with an opening, and container and the opening communicate with each other. The container includes a first position and a second position. The electronic device also includes an I/O connection unit, a pivot module and a cover. The I/O connection unit is disposed at the container, electrically connected to the electronic device and includes a connecting surface. The pivot module is connected to the I/O connection unit. The cover is connected to the pivot module. When the cover is shut, it covers the container and makes the I/O connection unit located at the first position. When the cover is open, it drives the pivot module to drive the I/O connection unit to move to the second position to make the connecting surface of the I/O connection unit aligned with the surface.

In the electronic device with a hidden I/O interface module disclosed in the invention, the I/O connection unit may be contained in the container inside the electronic device. Thus, the appearance of the electronic device is simpler, neater and more beautiful. When the I/O connection unit is used, the cover connected to the I/O connection unit needs to be opened to expose the I/O connection unit. Thus, the user may connect peripherals to the computer via the I/O connection unit conveniently.

DETAILED DESCRIPTION OF THE EMBODIMENTS

Figure 1:
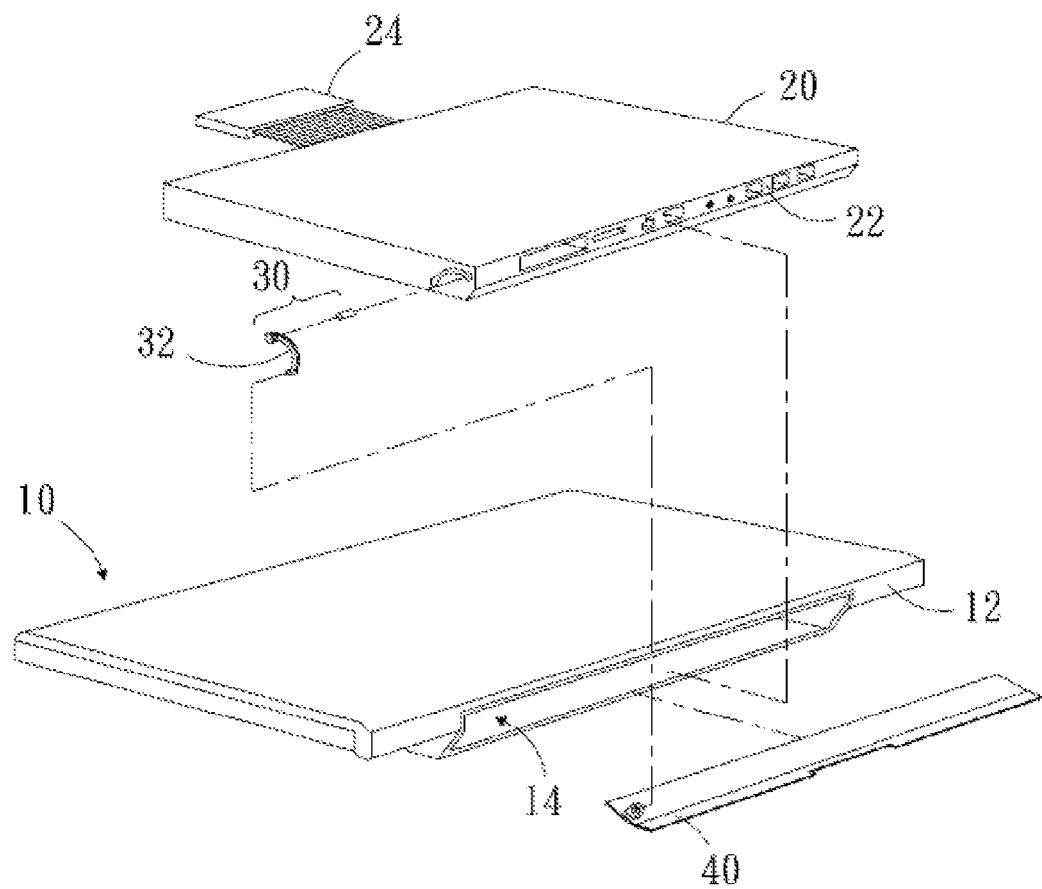
FIG. 1 is an exploded diagram showing the electronic device with a hidden I/O interface module in an embodiment of the invention.

FIG. 1 is an exploded diagram showing the electronic device with a hidden I/O interface module in an embodiment of the invention, and a computer is taken as an example of an electronic device. The electronic device with a hidden I/O interface module disclosed in the invention is disposed in a computer 10. The computer 10 includes a container 14 and a surface 12 with an opening, and container 14 and the opening communicate with each other. The container 14 includes a first position and a second position. A notebook computer is taken as an example of the computer 10, and it is not limited thereto. The electronic device with a hidden I/O interface module disclosed the invention includes an I/O connection unit 20, a pivot module 30 and a cover 40.

The I/O connection unit 20 is disposed at the container 14, and it is electrically connected to the computer 10 and includes a connecting surface 22. Since the I/O connection unit 20 may be moved at the first position and the second position of the container 14, to cooperate with the movability of the I/O connection unit 20, the I/O connection unit 20 is connected to the computer 10 via the FPC 24. The I/O connection unit 20 moves between the first position and the second position of the container 14, which is illustrated in detail hereinbelow.

In addition, as shown in FIG. 1, the I/O connection unit 20 includes multiple types of connection ports for allowing the computer 10 to connect peripherals. For example, it includes a USB port, a COM port, a RJ45 port, a PCMCIA port and so on. The surface for disposing the slots and the holes of the connection ports is called the connecting surface 22.

Figure 2A:
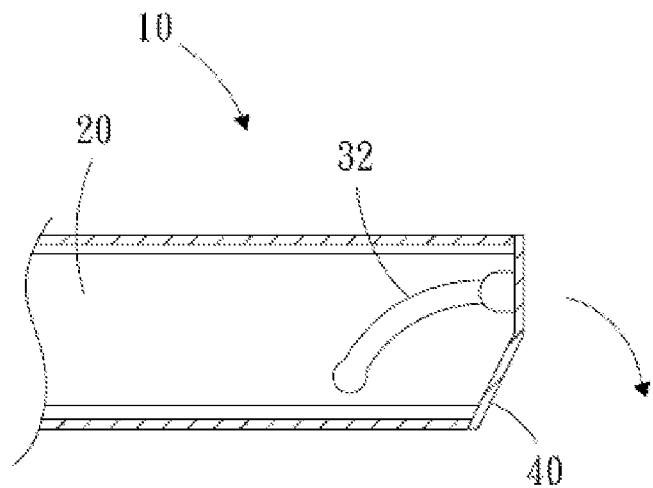
FIG. 2A is a first sectional diagram showing the pivot module in an embodiment of the invention.
Figure 2B:
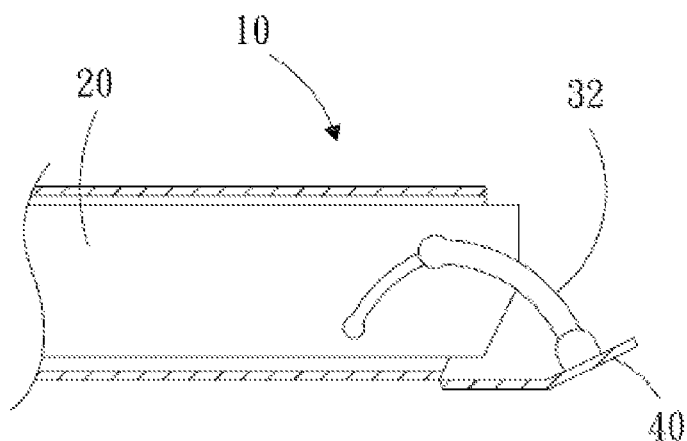
FIG. 2B is a second sectional diagram showing the pivot module in an embodiment of the invention.

The pivot module 30 is connected to the I/O connection unit 20, and the cover 40 is connected to the pivot module 30. That is, the cover 40 is connected to the I/O connection unit 20 via the pivot module 30. The connecting relation of the pivot module is shown in FIG. 2A and FIG. 2B. FIG. 2A and FIG.

2B are a first and a second sectional diagrams showing the pivot module in an embodiment of the invention. The pivot module 30 herein includes linkage 32 whose one end is connected to the I/O connection unit 20 and the other end is connected to the cover 40. FIG. 2A shows the connecting relation of the pivot module 30, the cover 40, the connecting relation of the pivot module 30 and the I/O connection unit 20, when the cover 40 is shut. FIG. 2B shows the connecting relation of the pivot module 30, the cover 40, the connecting relation of the pivot module 30, and the I/O connection unit 20 when the cover 40 is open.

Figure 3A:
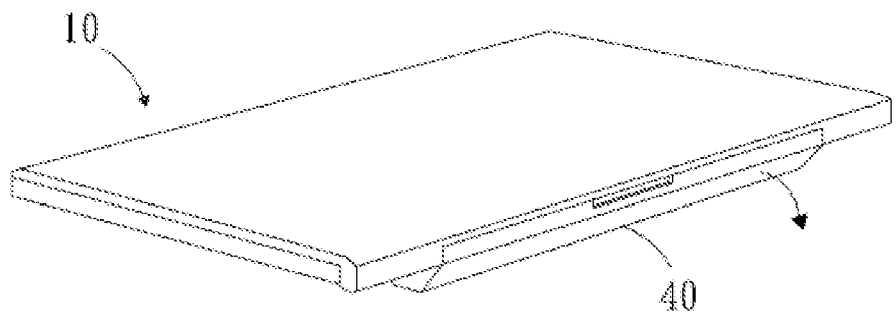
FIG. 3A is a first schematic diagram showing the operation mode of the electronic device with a hidden I/O interface module in an embodiment of the invention.
Figure 3B:
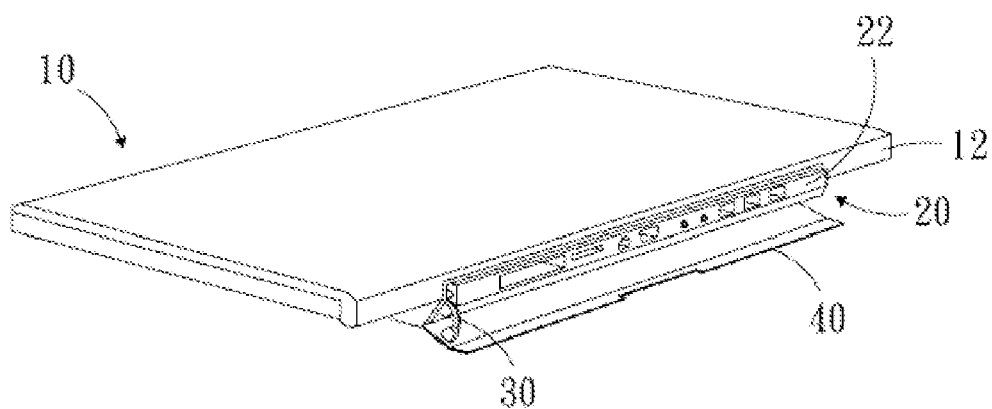
FIG. 3B is a second schematic diagram showing the operation mode of the electronic device with a hidden I/O interface module in an embodiment of the invention.

The connecting relations of the elements in the electronic device with a hidden I/O interface module are illustrated in the above. Then, the operation mode of the electronic device with a hidden I/O interface module is illustrated. FIG. 3A and FIG. 3B are a first and a second schematic diagrams showing the operation mode of the electronic device with a hidden I/O interface module in an embodiment of the invention. FIG. 3A shows the case in which the cover 40 is shut. When the cover 40 is shut, it may cover the container 14 and make the I/O connection unit 20 located at the first position of the container 14. That is, when the cover 40 is shut, the I/O connection unit 20 is contained in the container 14. The position where the I/O connection unit 20 is contained inside the container 14 is the first position called in the invention. At that moment, the user cannot see the I/O connection unit 20 from the outside, and the cover 40 is consistent with the computer 10 in appearance. Thus the appearance of the computer is simple and beautiful.

FIG. 3B shows the case in which the cover 40 is open. When connecting the I/O connection unit 20 to the peripherals, the cover 40 needs to be opened. At that moment, the cover 40 may drive the pivot module 30 to drive the I/O connection unit 20 to move to the second position of the container 14. The I/O connection unit 20 may be fixed to the second position, and the second position in the invention is the position where the connecting surface 22 of the I/O connection unit 20 is aligned with the surface 12.

From the illustration above, when the user does not need the I/O connection unit 20, the I/O connection unit 20 may be contained in the first position of the container 14. When the I/O connection unit 20 is used, the cover 40 needs to be opened to drive the I/O connection unit 20 to move to the second position via the connecting relation of the pivot module 30 and the cover 40 and the connecting relation of the pivot module 30 and the I/O connection unit 20. Thus, when the I/O connection unit 20 is located at the second position, the surface having the slots and holes for allowing the peripherals to be connected, namely the connecting surface 22, is aligned with the surface 12 of the computer 10 or slightly protrudes from the surface 12. Thus, the connectors of the peripherals may be connected to the computer conveniently without being limited by the shapes or sizes of the connectors of the peripherals. In the conventional technology, some holes or slots are disposed inside the surface 12, and when the connectors of the peripherals are too big, they cannot be connected to the holes or slots smoothly, which causes the use inconvenient.

In addition, when the user finishes using the I/O connection unit 20, he or she may shut the cover 40 to drive the I/O connection unit 20 to move to the first position of the container 14 and restore the I/O connection unit to the state in FIG. 3A in which the cover 40 is shut. Then, the I/O connection unit 20 may be contained in the container 14 again.

From the illustration above, the user may open and shut the cover 40, and to make the user open and shut the cover 40 easily, the pivot module 30 may include an elastic element such as a spring. The elastic element is connected to the I/O connection unit 20. When the cover 40 is opened, the cover 40 needs to be rotated to a certain angle, and resilience of the elastic element may make the I/O connection unit 20 ejected to the second position of the container 14 to allow the user to use automatically. Thus, the user may apply a small force, and the elastic element provides the resilience to make the I/O connection unit 20 move to the specific position.

In addition, another embodiment in which the cover 40 is opened and shut in an electric mode is provided. The pivot module 30 may include a motor to drive the cover 40 to open and shut. Thus, the user may trigger the motor by pressing a button. That is, when the I/O connection unit 20 is used, the button needs to be pressed, and the motor may start automatically to drive the cover 40 to open and then drive the I/O connection unit 20 to move to the second position of the container 14 to allow the user to use. When the I/O connection unit 20 is not used, the button only needs to be pressed again, and the motor starts again to drive the cover 40 to shut to make the I/O connection unit 20 contain in the first position of the container 14. The button may be additionally disposed at a proper position of the computer 10, and the function of the button also may be achieved by a specific key in a keyboard of the computer 10, which is not limited herein.

From the illustration above, the cover 40 is turned outward, and it is not limited thereto. In another embodiment of the invention, the cover 40 is opened by pressing in the direction towards the container 14 (namely pressing inward), and the pressing and opening mode is the prior art, which is not illustrated in detail. In the embodiment, the cover 40 is pressed to open, and with the elastic element above, the user only needs to press inward to open the cover 40, and then the resilience of the elastic element may drive the I/O connection unit 20 to move to the second position of the container 14 automatically to allow the user to use.

Figure 4A:
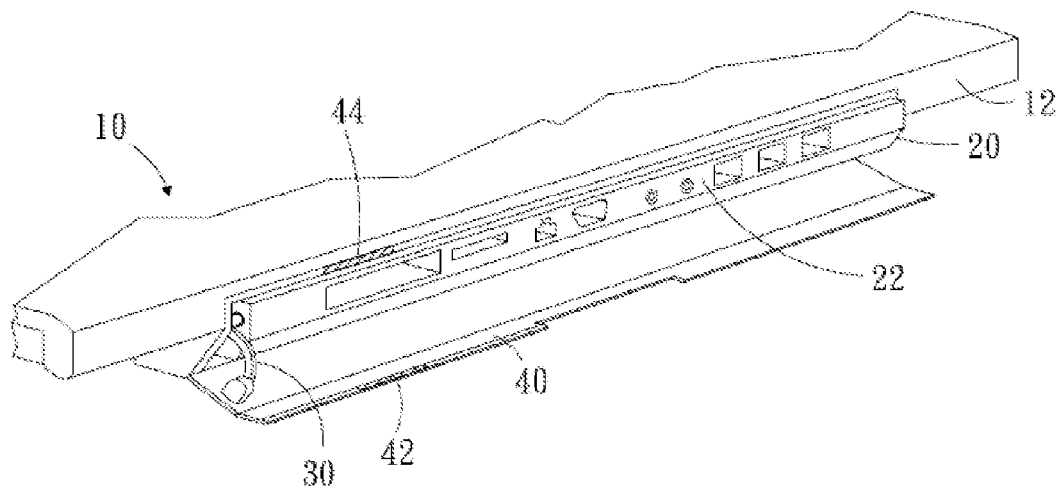
FIG. 4A is a schematic diagram showing the fastener of the cover in the first embodiment of the invention.
Figure 4B:
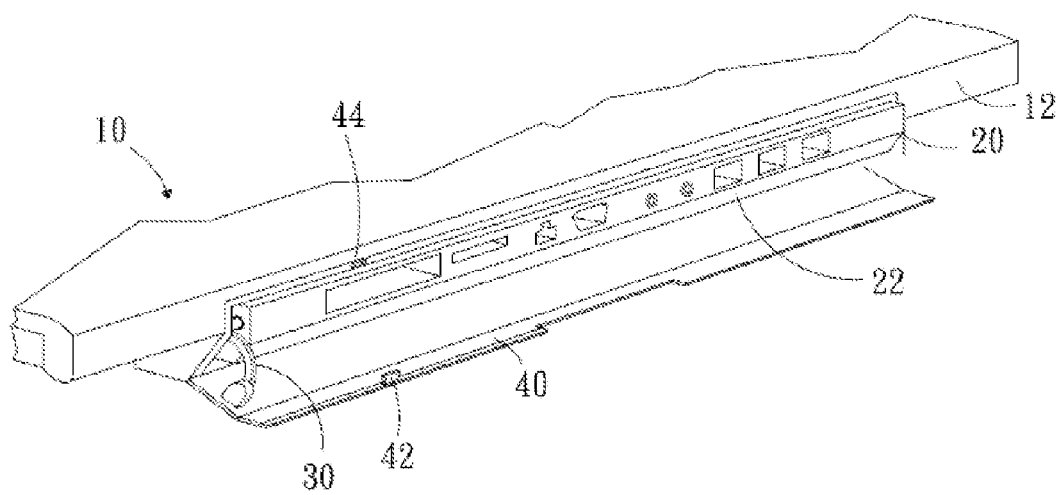
FIG. 4B is a schematic diagram showing the fastener of the cover in the second embodiment of the invention.

FIG. 4A and FIG. 4B are schematic diagrams showing a fastener of the cover in the first and second embodiments of the invention. To make the cover 40 fixed at the surface 12 of the computer 10 when the cover 40 is shut, the cover 40 includes a fastener 42, and the surface 12 includes an opposite fastener 44 corresponding to the fastener 42. When the cover 40 is shut, the fastener 42 may be connected to the opposite fastener 44.

In FIG. 4A, the fastener 42 and the opposite fastener 44 are magnetic elements. Thus, when the cover 40 is shut, the fastener 42 and the opposite fastener 44 attract each other to fix the cover 40 to the surface 12 of the computer 10 via the magnetic force. In anther aspect, in FIG. 4B, the fastener 42 is a hook and the opposite fastener 44 is a recess. Thus, when the cover 40 is shut, the hook may be fastened to the recess, and thus the cover 40 is fixed to the surface 12 of the computer 10.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device with a hidden input/output (I/O) interface module the electronic device comprising:
    a surface;
    a container having a first position and a second position;
    I/O connection unit disposed at the container, electrically connected to the electronic device and having a connecting surface;
    a pivot module connected to the I/O connection unit; and a cover connected to the pivot module, when the container is covered by shutting the cover, the pivot module drives the I/O connection unit to move to the first position, and when the cover is open, the pivot module drives the I/O connection unit to move to the second position to make the connecting surface of the I/O connection unit aligned with the surface.

2. The electronic device according to claim 1, wherein the pivot module comprises:

a linkage, one end of the linkage is connected to the I/O connection unit and the other end is connected to the cover.

3. The electronic device according to claim 1, wherein the cover comprises a fastener, and the surface has an opposite fastener, and when the cover is shut, the fastener and the opposite fastener are connected to each other.

4. The electronic device according to claim 3, wherein the fastener and the opposite fastener are magnetic elements.

5. The electronic device according to claim 3, wherein the fastener is a hook, and the opposite fastener is a recess.

6. The electronic device according to claim 1, wherein the I/O connection unit is electrically connected to the electronic device via a flexible printed circuit (FPC).

7. The electronic device according to claim 1, wherein the I/O connection unit is selected from the group consisting of a universal serial bus (USB) port, a COM port, a RJ45 port, a PCMCIA port and their combinations.

* * * * *